(12) United States Patent
Fujisaki

(10) Patent No.: US 9,971,131 B2
(45) Date of Patent: May 15, 2018

(54) ZOOM LENS AND IMAGING APPARATUS HAVING THE SAME

(71) Applicant: CANON KABUSHIKI KAISHA, Tokyo (JP)

(72) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 14/946,515

(22) Filed: Nov. 19, 2015

(65) Prior Publication Data

US 2016/0154217 A1 Jun. 2, 2016

(30) Foreign Application Priority Data

Nov. 28, 2014 (JP) .................................. 2014-242515

(51) Int. Cl.
*G02B 15/14* (2006.01)
*G02B 15/173* (2006.01)

(52) U.S. Cl.
CPC .................. *G02B 15/173* (2013.01)

(58) Field of Classification Search
CPC ............................ G02B 15/173; G02B 13/004; G02B 27/0025; G02B 27/646; G02B 9/34; G02B 13/18
USPC ....... 359/558, 574, 683, 686, 688, 707, 715, 359/740, 775
See application file for complete search history.

(56) References Cited

U.S. PATENT DOCUMENTS

2011/0273776 A1* 11/2011 Obama ................ G02B 15/173
359/581
2013/0215294 A1* 8/2013 Nishio ................ G02B 15/173
348/240.1

FOREIGN PATENT DOCUMENTS

JP 2012-220872 A 11/2012
JP 2012-226224 A 11/2012

* cited by examiner

*Primary Examiner* — Thomas K Pham
*Assistant Examiner* — Sharrief Broome
(74) *Attorney, Agent, or Firm* — Canon USA Inc., IP Division

(57) ABSTRACT

A zoom lens includes, in order from an object side to an image side, a first lens unit having positive refractive power, a second lens unit having negative refractive power, a third lens unit having positive refractive power, a fourth lens unit having negative refractive power, and a rear group that includes one or more lenses and has positive refractive power. In the zoom lens, a distance between lens units arranged next to each other changes during zooming. At least one of the lens units provided on the image side of the third lens unit includes a resin lens having positive refractive power and a resin lens having negative refractive power. A material of the resin lens having positive refractive power and a material of the resin lens having negative refractive power are set appropriately.

14 Claims, 12 Drawing Sheets

ZOOM LENS AND IMAGING APPARATUS HAVING THE SAME

BACKGROUND OF THE INVENTION

Field of the Invention

The present invention relates to a zoom lens and an imaging apparatus including the zoom lens. The zoom lens may be applicable to, for example, an imaging apparatus with an image pickup element, such as a digital still camera, a video camera, a monitoring camera, and a broadcasting camera, and an imaging apparatus such as a camera using a silver-halide photographic film.

Description of the Related Art

Imaging apparatuses, such as a digital still camera or a video camera, employing a solid-state image pickup element continue to be improved to have sophisticated applications and the entire body has been downsized. A zoom lens used in such apparatuses is desired to have a short total lens length and a high zoom ratio. Further, to maintain the aim of providing affordable imaging apparatuses with reduced body size, it is required to reduce the weight and the cost of the lens.

A known zoom lens having a short total lens length and a high zoom ratio includes a positive-lead type zoom lens, which is, a zoom lens including, in order from an object side to an image side, a first lens unit having positive refractive power, a second lens unit having negative refractive power, a third lens unit having positive refractive power, and a fourth lens unit having negative refractive power. Further, to reduce the weight and the cost of the lens, some known zoom lenses include a lens made of a material other than glass, for example, a resin lens made of a resin material.

As a positive-lead type zoom lens including a resin material, in zoom lenses discussed in Japanese Patent Application Laid-Open Nos. 2012-220872 and 2012-226224, a resin lens having positive refractive power is used in a first lens unit and, further, a resin lens having negative refractive power is used in a third lens unit.

Compared with a glass lens, a resin lens generally has a greater variation of refractive index due to a temperature change or a manufacturing error and has more influence of a change in shape due to expansion and shrinkage of the resin material. This tends to easily cause deterioration of optical performance in resin lenses because the amount of focus error and spherical aberration deviation due to temperature change or a manufacturing error becomes greater than in glass counterparts. In a positive-lead type zoom lens composed of a relatively small number of lenses, since refractive power of each lens becomes strong, deterioration of optical performance due to temperature change is likely to be caused in the entire zoom area. Therefore, improvements in resin-based zoom lenses remain highly desirable.

SUMMARY OF THE INVENTION

According to an aspect of the present invention, a zoom lens includes, in order from an object side to an image side, a first lens unit having positive refractive power, a second lens unit having negative refractive power, a third lens unit having positive refractive power, a fourth lens unit having negative refractive power, and a rear group including one or more lens units and having positive refractive power, wherein a distance between the lens units arranged next to each other changes during zooming, wherein at least one of the lens units provided on the image side of the third lens unit comprises a resin lens Lkp having positive refractive power and a resin lens Lkn having negative refractive power, and wherein following conditional expressions are satisfied:

$$50.0 < vdkp < 70.0,$$

$$15.0 < vdkn < 30.0,$$

$$1.500 < Ndkp < 1.700, \text{ and}$$

$$1.500 < Ndkn < 1.700$$

where a refractive index of a material of the resin lens Lkp having positive refractive power is denoted by Ndkp, Abbe number thereof is denoted by vdkp, a refractive index of a material of the resin lens Lkn having negative refractive power is denoted by Ndkn, and Abbe number thereof is denoted by vdkn.

Further features of the present invention will become apparent from the following description of exemplary embodiments with reference to the attached drawings.

DESCRIPTION OF THE EMBODIMENTS

Hereinafter, a zoom lens and an imaging apparatus including the zoom lens according to exemplary embodiments of the present invention will be described in detail with reference to the accompanied drawings. The zoom lens according to an exemplary embodiment of the present invention includes, in order from an object side to an image side thereof, a first lens unit having positive refractive power, a second lens unit having negative refractive power, a third lens unit having positive refractive power, a fourth lens unit having negative refractive power, and a rear group including one or more lens units. Here, a lens unit includes one or more lens elements that integrally move during zooming. The lens unit is only required to include one or more lenses, and does not necessarily include a plurality of lenses. Further, the lens element is an integrally formed lens, such as a single lens, a cemented lens in which a plurality of lenses are cemented together, or a replica aspheric lens created by adding a resin layer on at least one surface of a spherical lens.

Figure 1:
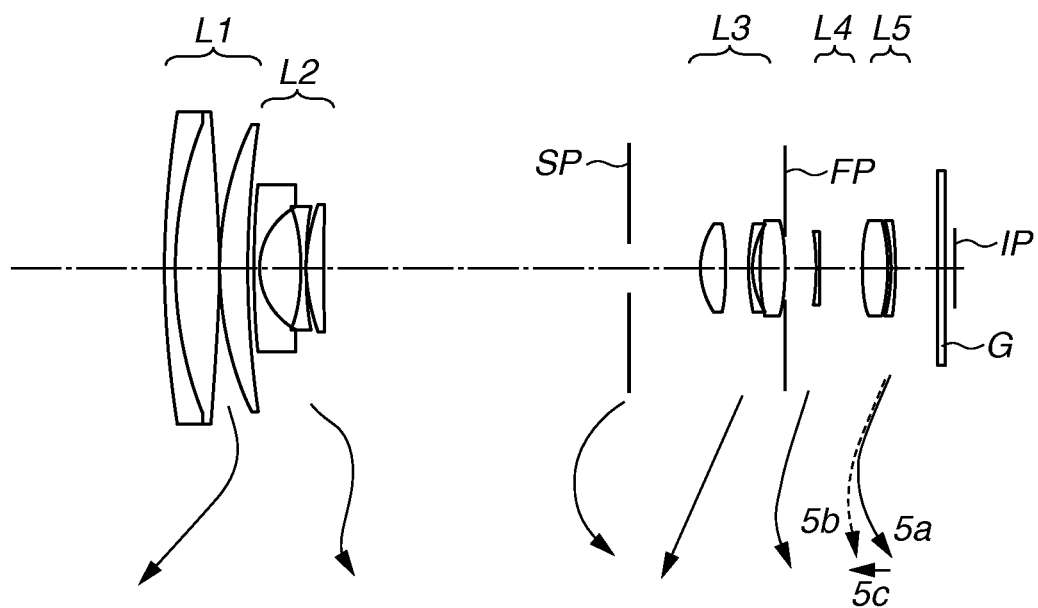
FIG. 1 is a cross-sectional view of a zoom lens at a wide-angle end according to a first exemplary embodiment.
Figure 2A:
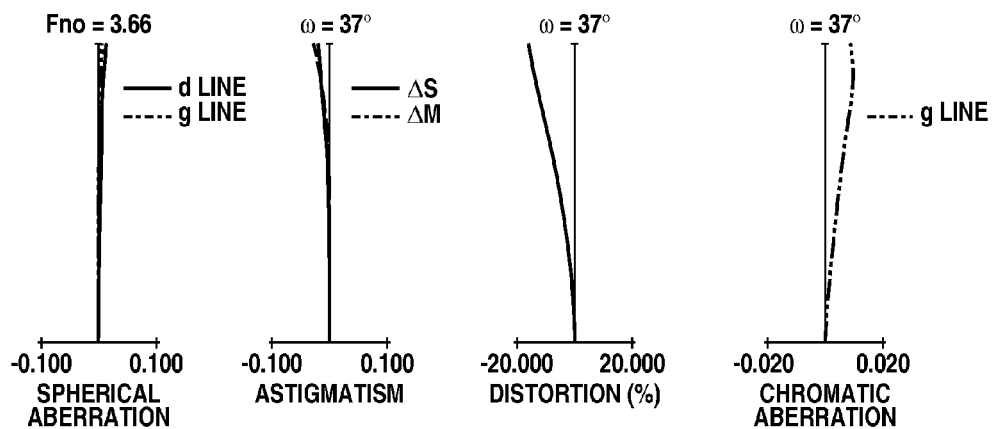
FIGS. 2A, 2B, and 2C are aberration diagrams of the zoom lens at the wide-angle end, a middle zoom position, and telephoto end, respectively, according to the first exemplary embodiment.
Figure 2B:
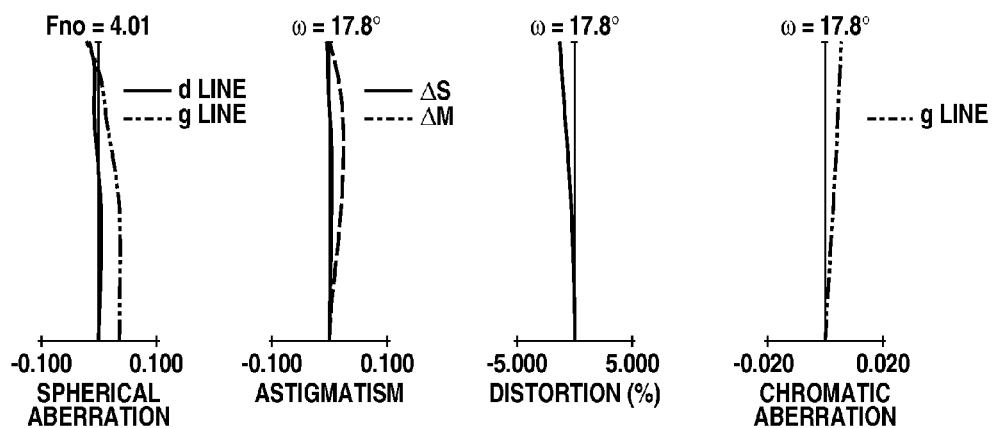
Figure 2C:
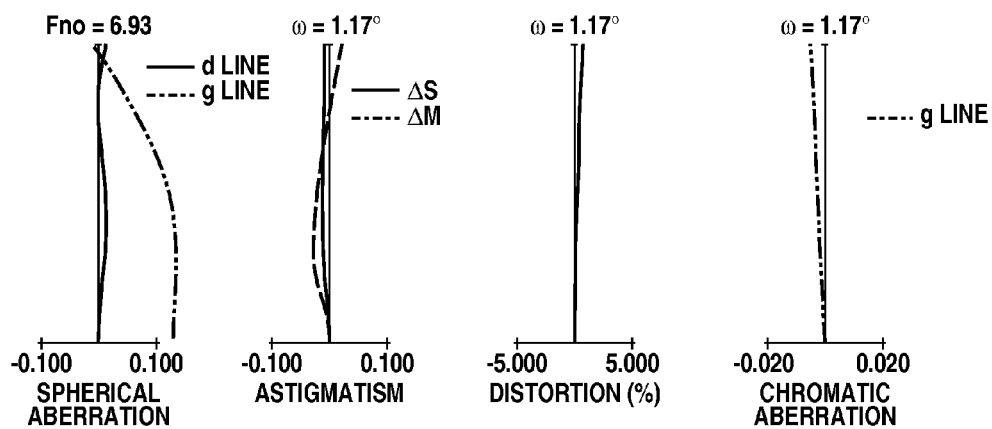
Figure 3:
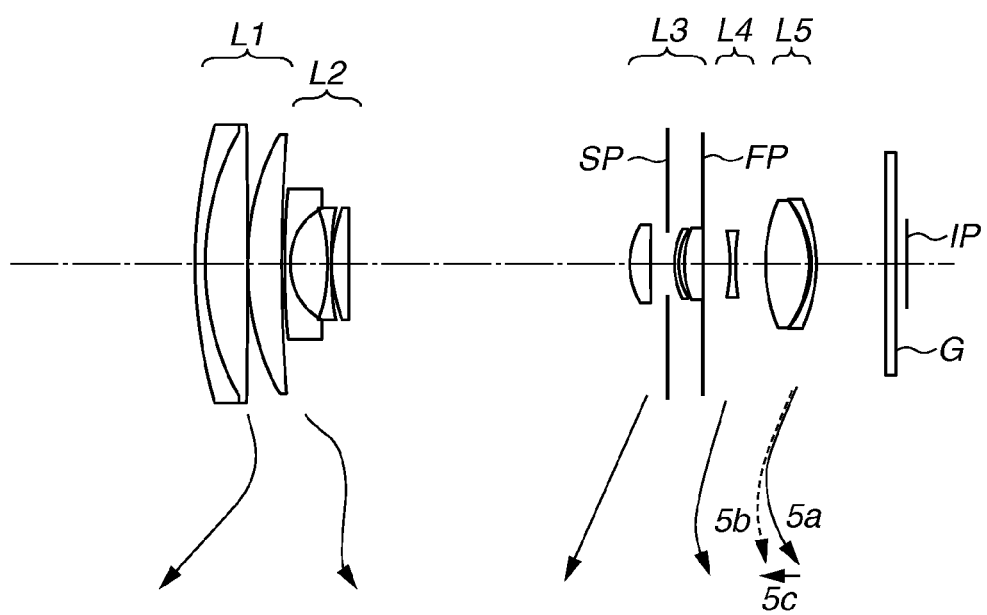
FIG. 3 is a cross-sectional view of a zoom lens at a wide-angle end according to a second exemplary embodiment.
Figure 4A:
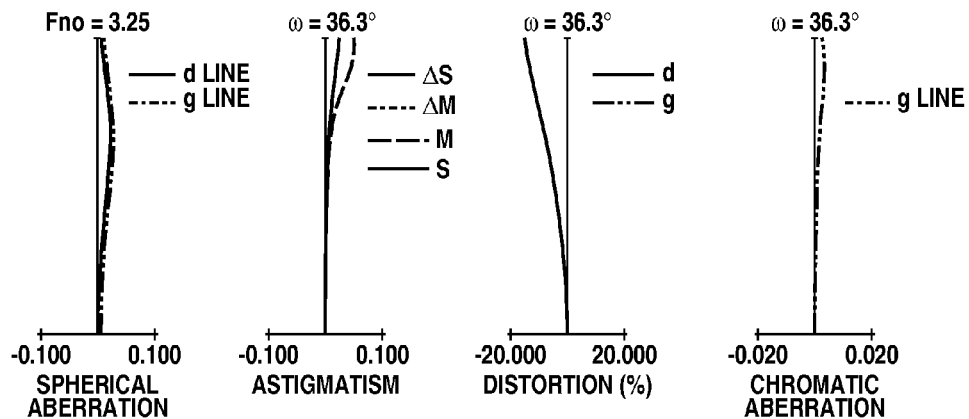
FIGS. 4A, 4B, and 4C are aberration diagrams of the zoom lens at the wide-angle end, a middle zoom position, and a telephoto end, respectively, according to the second exemplary embodiment.
Figure 4B:
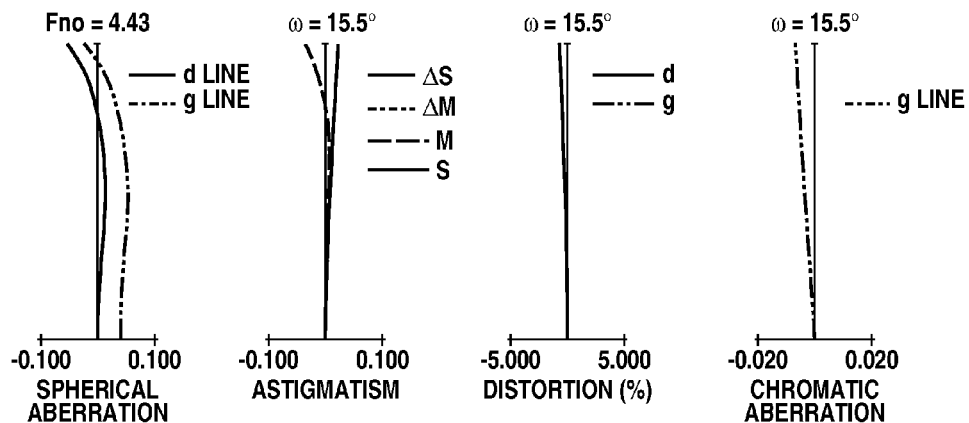
Figure 4C:
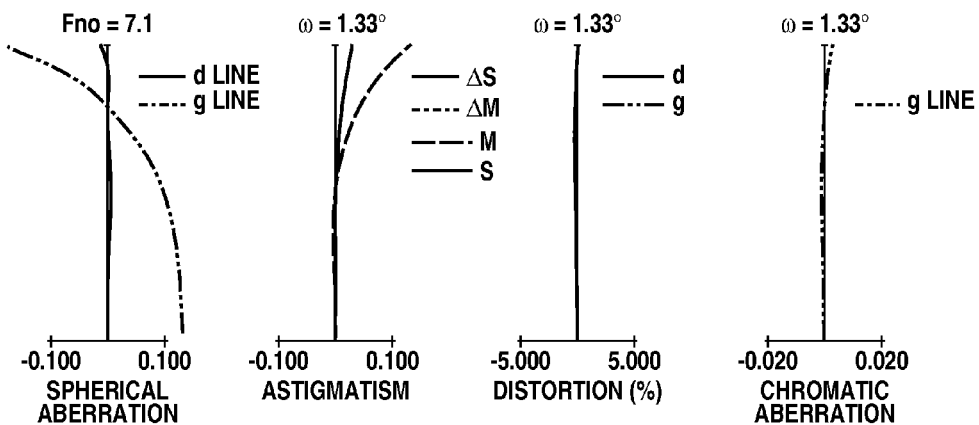

FIG. 1 is a cross-sectional view of a zoom lens at a wide-angle end according to a first exemplary embodiment. FIGS. 2A, 2B, and 2C are aberration diagrams of the zoom lens at the wide-angle end, a middle zoom position, and telephoto end, respectively, according to the first exemplary embodiment. In the first exemplary embodiment, the zoom lens has a zoom ratio of 43.24 and an aperture ratio of about 2.67 to 6.08. FIG. 3 is a cross-sectional view of a zoom lens at a wide-angle end according to a second exemplary embodiment. FIGS. 4A, 4B, and 4C are aberration diagrams of the zoom lens at the wide-angle end, a middle zoom position, and a telephoto end, respectively, according to the second exemplary embodiment. In the second exemplary embodiment, the zoom lens has a zoom ratio of 37.30 and an aperture ratio of about 3.25 to 7.10.

Figure 5:
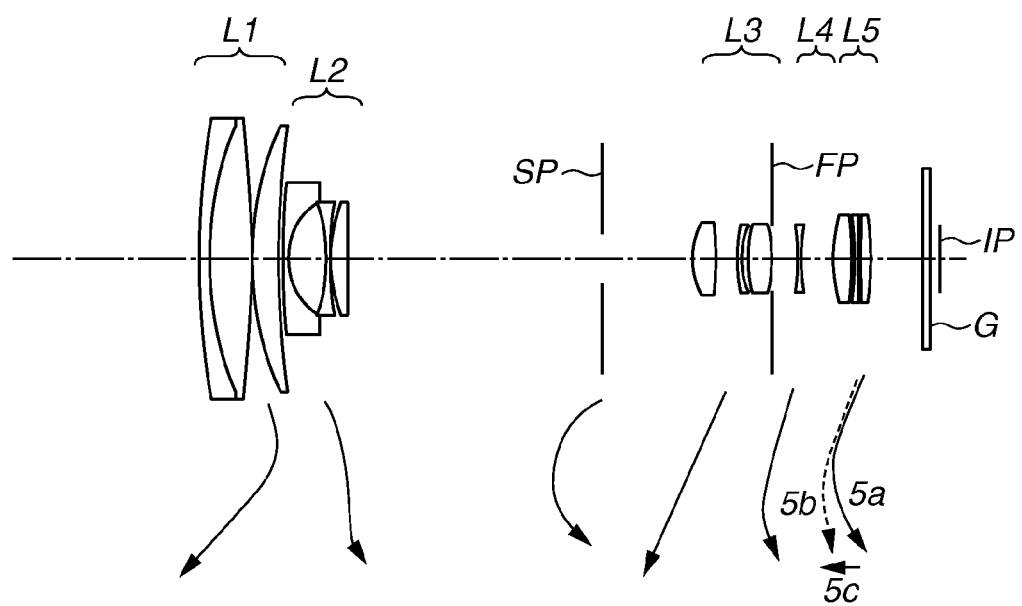
FIG. 5 is a cross-sectional view of a zoom lens at a wide-angle end according to a third exemplary embodiment.
Figure 6A:
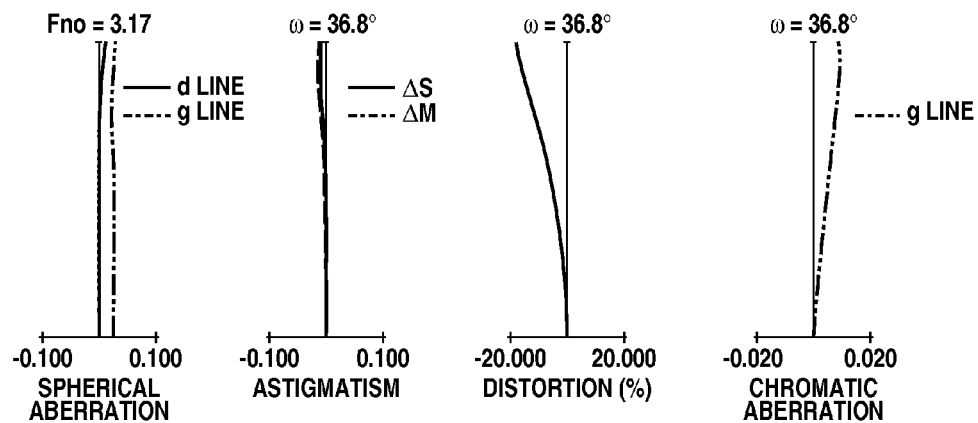
FIGS. 6A, 6B, and 6C are aberration diagrams of the zoom lens at the wide-angle end, a middle zoom position, and a telephoto end, respectively, according to the third exemplary embodiment.
Figure 6B:
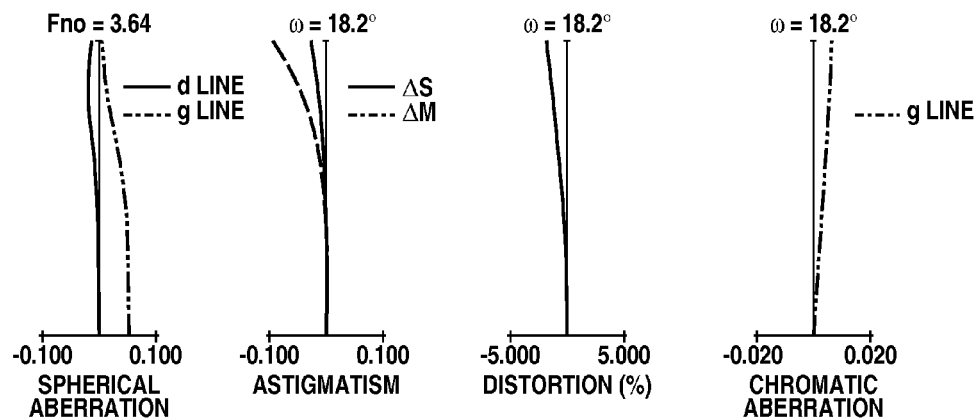
Figure 6C:
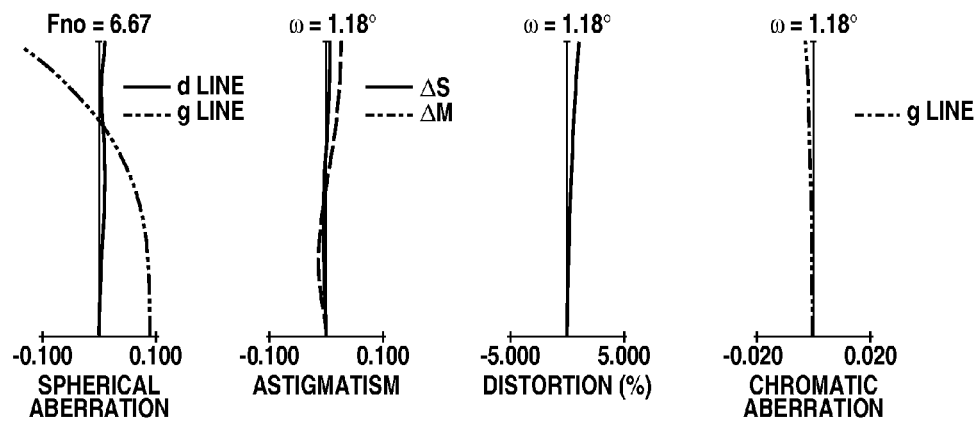
Figure 7:
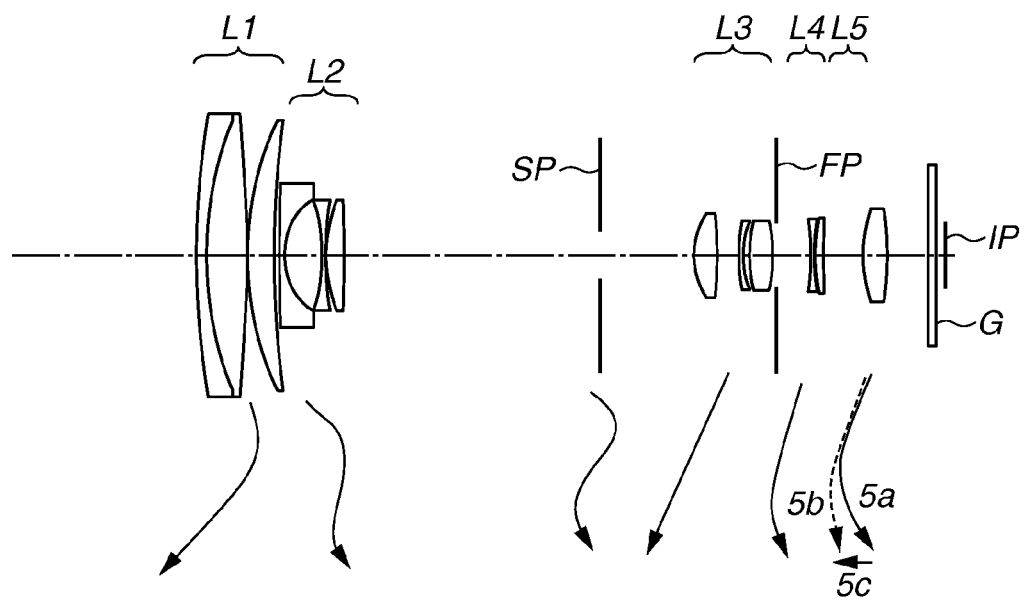
FIG. 7 is a cross-sectional view of a zoom lens at a wide-angle end according to a fourth exemplary embodiment.
Figure 8A:
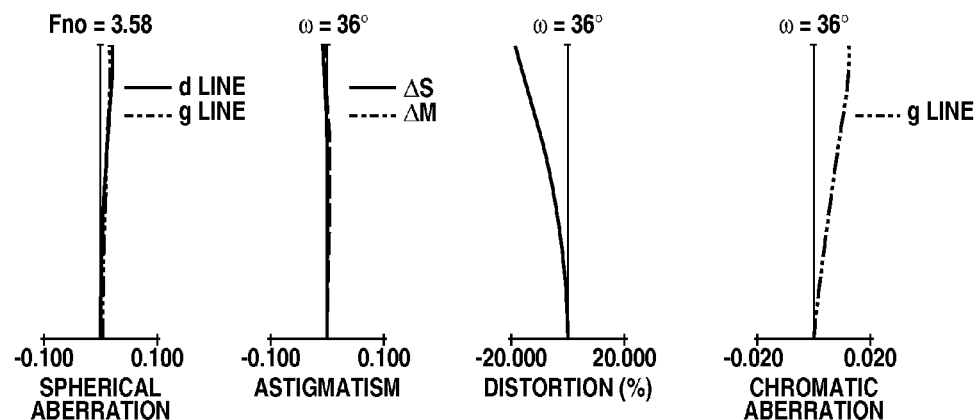
FIGS. 8A, 8B, and 8C are aberration diagrams of the zoom lens at the wide-angle end, at a middle zoom position, at a telephoto end, respectively, according to the fourth exemplary embodiment.
Figure 8B:
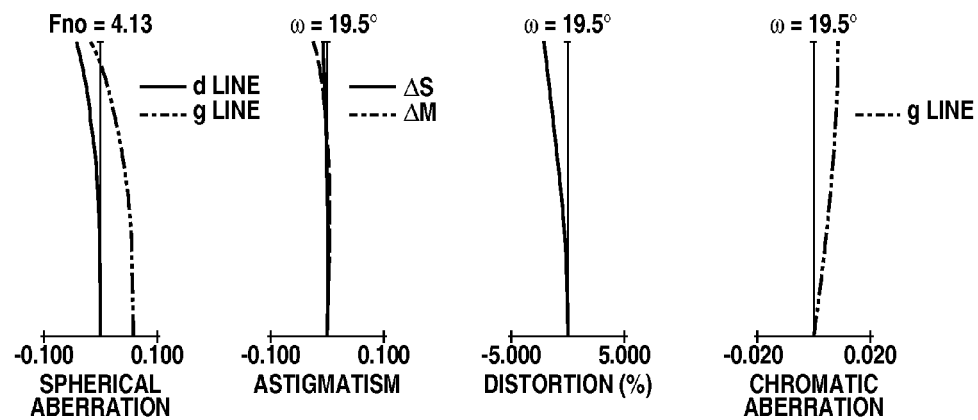
Figure 8C:
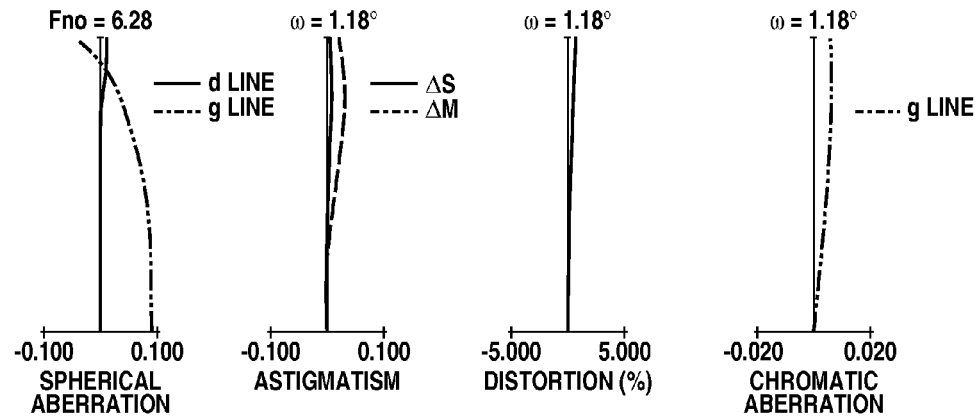

FIG. 5 is a cross-sectional view of a zoom lens at a wide-angle end according to a third exemplary embodiment. FIGS. 6A, 6B, and 6C are aberration diagrams of the zoom lens at the wide-angle end, a middle zoom position, and a telephoto end, respectively, according to the third exemplary embodiment. In the third exemplary embodiment, the zoom lens has a zoom ratio of 42.81 and an aperture ratio of about 2.88 to 6.08. FIG. 7 is a cross-sectional view of a zoom lens at a wide-angle end according to a fourth exemplary embodiment. FIGS. 8A, 8B, and 8C are aberration diagrams of the zoom lens at the wide-angle end, a middle zoom position, and a telephoto end, respectively, according to the fourth exemplary embodiment. In the fourth exemplary embodiment, the zoom lens has a zoom ratio of 42.98 and an aperture ratio of about 3.58 to 6.28.

Figure 9:
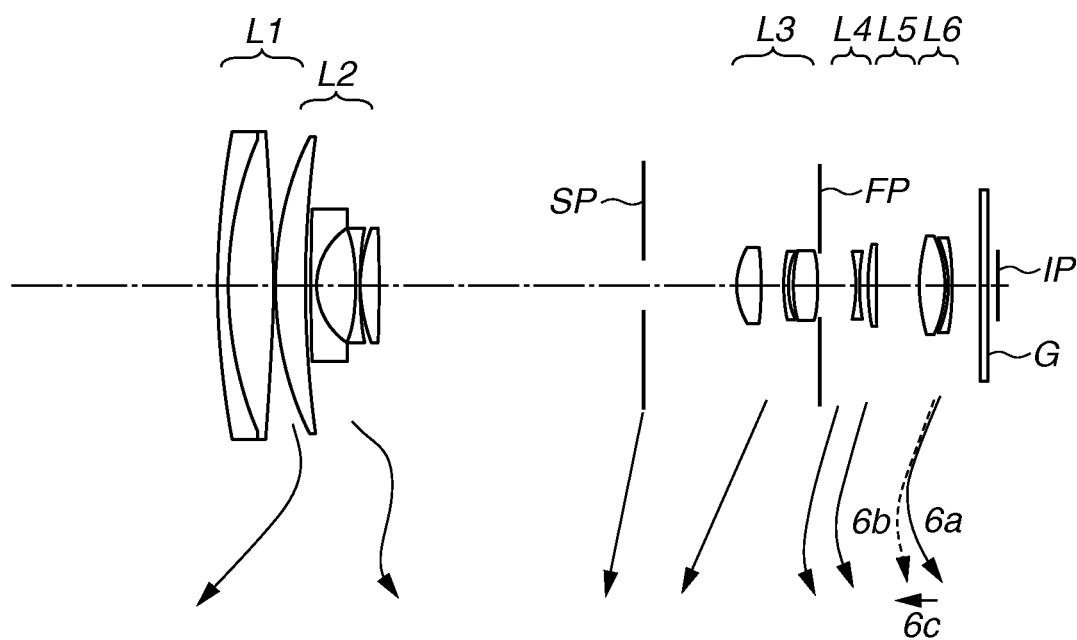
FIG. 9 is a cross-sectional view of a zoom lens at a wide-angle end according to a fifth exemplary embodiment.
Figure 10A:
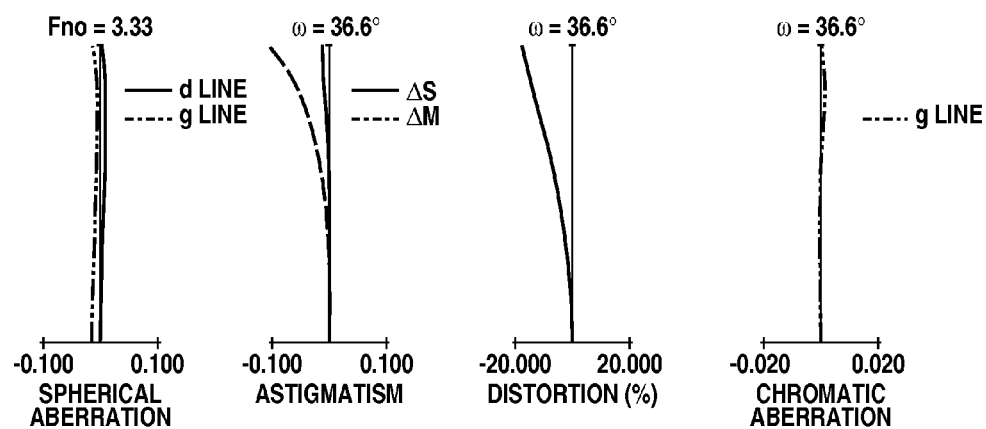
FIGS. 10A, 10B, and 10C are aberration diagrams of the zoom lens at the wide-angle end, a middle zoom position, and a telephoto end, respectively, according to the fifth exemplary embodiment.
Figure 10B:
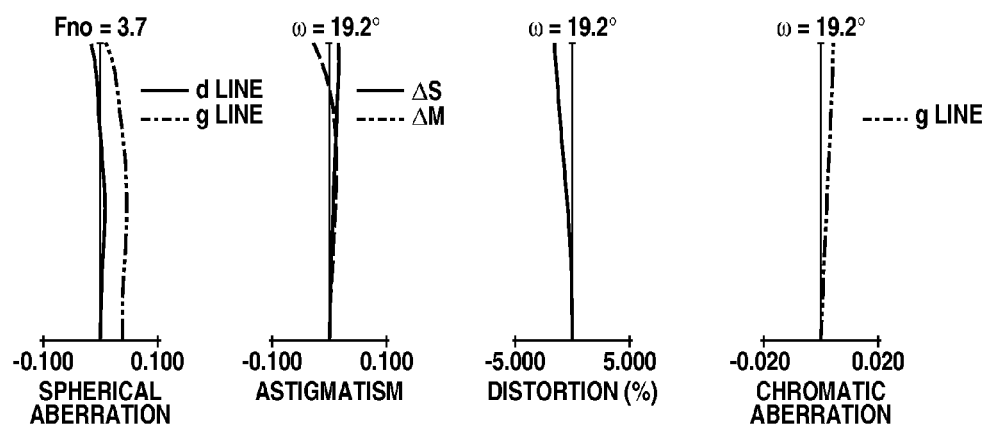
Figure 10C:
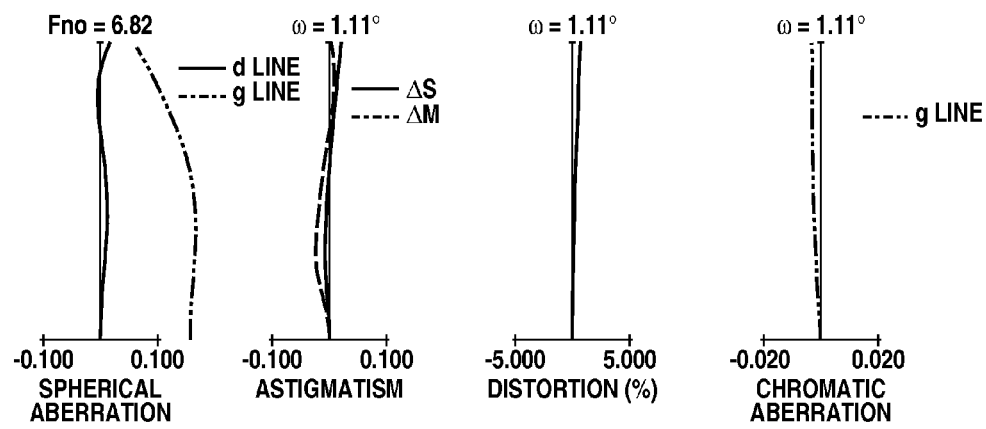

FIG. 9 is a cross-sectional view of a zoom lens at a wide-angle end according to a fifth exemplary embodiment. FIGS. 10A, 10B, and 10C are aberration diagrams of the zoom lens at the wide-angle end, a middle zoom position, and a telephoto end, respectively, according to the fifth exemplary embodiment. In the fifth exemplary embodiment, the zoom lens has a zoom ratio of 45.11 and an aperture ratio of about 2.98 to 6.08. In FIGS. 1, 3, 5, 7 and 9 corresponding to cross-sectional views of a zoom lens at a wide-angle end according to the first to fifth exemplary embodiments, respectively, loci of movement of each of the lens units from the wide-angle end to the telephoto end are illustrated by solid dark arrows.

Figure 11:
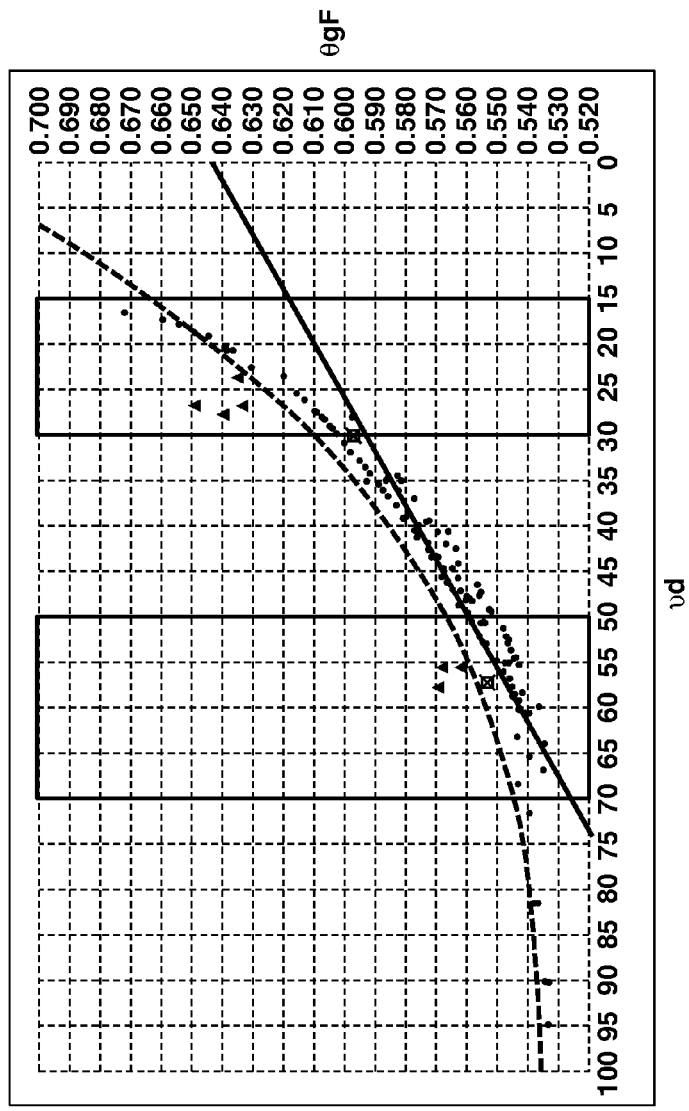
FIG. 11 is a θgF-vd chart.
Figure 12:
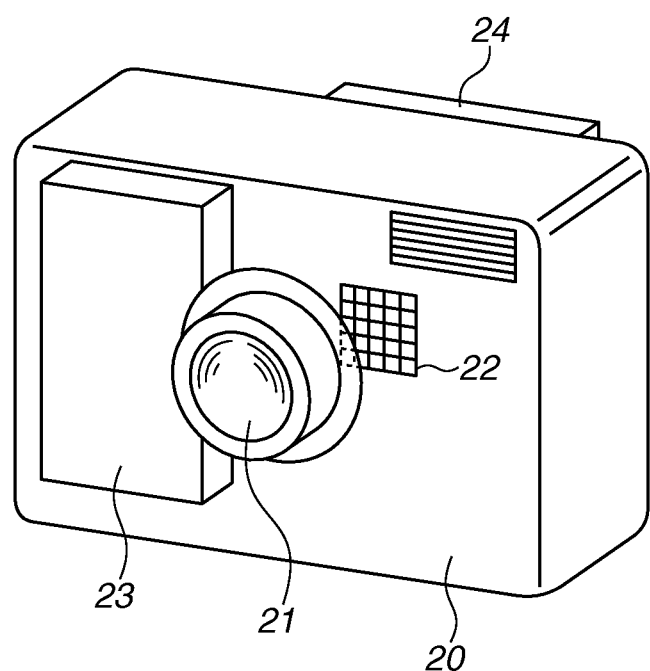
FIG. 12 is a schematic diagram of a main parts of an imaging apparatus according to an exemplary embodiment of the present invention.

FIG. 11 is a θgF-vd chart. FIG. 12 is a schematic diagram of a main part of a digital still camera (imaging apparatus) that includes a zoom lens according to an exemplary embodiment of the present invention. The zoom lens according to each exemplary embodiment is a photographic lens system that is used in an imaging apparatus such as a video camera, a digital still camera, a silver-halide film camera, and a television camera. In the lens cross-sectional views, the left side is an object side (front side) and the right side is an image side (rear side). Further, in the lens cross-sectional views, the reference "Li" represents the "i"th lens unit where the reference "i" represents the order of the lens unit from the object side to the image side.

The zoom lenses according to the first to fourth exemplary embodiments each consist of, in order from an object side to an image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. In the first to fourth exemplary embodiments, a positive-lead-type five-unit zoom lens consisting of five lens units is described, in which a rear group is composed of the fifth lens unit L5 having positive refractive power.

The zoom lens according to the fifth exemplary embodiment consists of, in order from the object side to the image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having positive refractive power. In the fifth exemplary embodiment, a positive-lead-type six-unit zoom lens consisting of six lens units is described, in which a rear group is composed of the fifth lens unit L5 having positive refractive power and the sixth lens unit L6 having positive refractive power.

In the exemplary embodiments, the reference "SP" represents an aperture stop. In the zoom lens according to the first to third and fifth exemplary embodiments, an aperture stop SP is provided between the second lens unit L2 and the third lens unit L3. During zooming from the wide-angle end to the telephoto end, the aperture stop SP moves in a locus different from that of each lens unit. With this movement, a rapid reduction of the peripheral light quantity at the wide angle side can be prevented while a front lens diameter is reduced.

In the zoom lens according to the second exemplary embodiment, the aperture stop SP is provided inside the third lens unit L3. With this arrangement, a distance between the second lens unit L2 and the third lens unit L3 at the telephoto end is shortened and this realizes that the total lens length at the telephoto end is shortened.

An optical block "G" includes, for example, an optical filter, a face plate, a low-pass filter, and an infrared cut filter. As for an image plane IP, when the zoom lens is used as an imaging optical system of a video camera or a digital camera, the image plane IP corresponds to a solid-state image pickup element (photoelectric conversion element) such as a charge-coupled device (CCD) sensor and a complementary metal-oxide semiconductor (CMOS) sensor. When the zoom lens is used as an imaging optical system of a silver-halide film camera, the image plane IP corresponds to a film plane.

In spherical aberration diagrams, "Fno" represents an F number and the diagram indicates a spherical aberration for d line (wavelength of 587.6 nm) and g line (wavelength of 435.8 nm). In astigmatism diagrams, "ΔS" represents a sagittal image plane and "ΔM" represents a meridional image plane. Distortion aberration diagrams illustrate distortion aberration for the d line. Chromatic aberration diagrams illustrate a chromatic aberration for the g line. "ω" represents an imaging half angle of view.

In each exemplary embodiment, as indicated by the arrows in the lens cross-sectional views, the lens units move during zooming from the wide-angle end to the telephoto end, and distances between lens units arranged next to each other change. More specifically, in each exemplary embodiment, the first lens unit L1 moves as drawing a locus convex toward the image side during zooming from the wide-angle end to the telephoto end. The second lens unit L2 has moved to a position closer to the image side when the zoom lens is at the telephoto end than when it is at the wide-angle end. The third lens unit L3 has moved to a position closer to the object side when the zoom lens is at the telephoto end than when it is at the wide-angle end. The fourth lens unit L4 has moved to a position closer to the object side when the zoom lens is at the telephoto end than when it is at the wide-angle end.

In the zoom lens according to the first to fourth exemplary embodiments, the fifth lens unit L5 moves as drawing a locus convex toward the object side. Further, in the zoom lens according to the fifth exemplary embodiment, the fifth lens unit L5 has moved to a position closer to the object side when the zoom lens is at the telephoto end than when it is at the wide-angle end. The sixth lens unit L6 moves as drawing a locus convex toward the object side.

In the zoom lens according to each exemplary embodiment, the first lens unit L1 and the third lens unit L3 have moved to a position closer to the object side when the zoom lens is at the telephoto end than when it is at the wide-angle end. With this, the total lens length at the wide-angle end is shortened and downsizing of the front lens diameter can be realized. Especially, during zooming, since the first lens unit L1 having positive refractive power is moved toward the object side, a relatively large variable power is given to the second lens unit L2.

Further, the zooming lens according to the first to fourth exemplary embodiments, the fifth lens unit L5 serves as a focus lens unit. In the zooming lens according to the fifth exemplary embodiment, the sixth lens unit L6 serves as a focus lens unit.

In the zoom lens according to the first to fourth exemplary embodiments, when the zoom lens is at the telephoto end and focusing is performed from an infinite-distance object to a near-distance object, as indicated by an arrow $5c$ in the lens cross-sectional views, the fifth lens unit L5 is moved to the object side. A solid-line arrow $5a$ and a dotted-line arrow $5b$ in the lens cross-sectional views illustrate a moving locus to compensate image plane variation caused by zooming from the wide-angle end to the telephoto end. The solid line arrow $5a$ indicates the moving locus in the case where the infinite-distance object is focused and focusing is performed, while the dotted line arrow $5b$ indicates the moving locus in the case where the near-distance object is focused and focusing is performed.

In the zoom lens according to the fifth exemplary embodiment, when the zoom lens is at the telephoto end and focusing is performed from an infinite-distance object to a near-distance object at the telephoto end, as indicated by an arrow $6c$ as illustrated in FIG. 9 (lens cross-sectional view), the sixth lens unit L6 is moved to the object side. A solid-line arrow $6a$ and a dotted-line $6b$ in the lens cross-sectional view illustrate a moving locus to compensate image plane variation caused by zooming from the wide-angle end to the telephoto end. The solid line arrow $6a$ indicates the moving locus in the case where the infinite-distance object is focused and focusing is performed, while the dotted line arrow $6b$ indicates the moving locus in the case where the near-distance object is focused and focusing is performed.

Here, in the zoom lens according to each exemplary embodiment, the fourth lens unit L4 may be used as a focus lens unit. With the fourth lens unit L4 serving as a focus lens unit, when the zoom lens is at the telephoto end and focusing is performed from the infinite-distance object to near-distance object, the fourth lens unit L4 is moved to the image side.

Further, in each exemplary embodiment, an image shake correction is performed by moving the entire or a part of the third lens unit L3 to have a component in a vertical direction to the optical axis.

In each exemplary embodiment, in the "k"th lens unit Lk ("k" is an integer number equal to or greater than four) provided closer to the image plane IP than to the third lens unit L3, a resin lens Lkp having positive refractive power and a resin lens Lkn having negative refractive power are used. This configuration can reduce the weight and the cost of the zoom lens. Here, the resin lens represents a lens including a resin material, such as indium tin oxide (ITO) and titanium oxide ($TiO_2$). The resin lens may be a lens made of only a resin material or a lens in which nanoparticles such as ITO or $TiO_2$ are dispersed in resin material.

In general, when the weight of each lens unit becomes large, a lens barrel is deformed in a direction of gravitational force by the weight of the lens in an imaging status, so that the optical performance may be reduced. Here, a specific gravity of a general glass material is equal to or greater than 2.0. On the other hand, a specific gravity of a general resin material is about 1.5. Accordingly, when a resin lens is used in the zoom lens, the weight of the zoom lens can be largely reduced.

Meanwhile, a linear expansion coefficient of a resin material corresponding to a temperature change is ten times larger than a linear expansion coefficient of a glass material. Accordingly, when a resin lens is used, the lens shape largely changes because of the temperature change, and aberration is likely to occur. Therefore, a resin lens having positive refractive power and a resin lens having negative refractive power are used within a single lens unit to suitably cancel an occurrence of spherical aberration, image plane curvature, or the like due to temperature change, suppressing the reduction of the optical performance.

Further, according to the exemplary embodiments, the resin lens Lkp having positive refractive power and the resin lens Lkn having a negative refractive power are provided with an air space therebetween. With this arrangement, there are more lens surfaces to which curvature radius can be independently set and an occurrence of aberration (spherical aberration or image plane curvature) due to temperature change can be suitably canceled. The level of changes in the lens shape due to temperature change differs according to materials of the lens. Accordingly, it is not desirable to cement two resin lenses because optical performance and cementation strength may be degraded.

In each exemplary embodiment, to suitably correct the chromatic aberration, the material of resin lens is selected so that Abbe number of the material of the negative lens is smaller than that of the material of the positive lens.

In each exemplary embodiment, a refractive index based on the d line of the material of the resin lens Lkp having positive refractive power and included in the "k"th lens unit Lk is denoted by Ndkp and the Abbe number is denoted by vdkp. Further, the following conditional expressions are satisfied:

$$50.0 < vdkp < 70.0 \quad (1)$$

$$15.0 < vdkn < 30.0 \quad (2)$$

$$1.500 < Ndkp < 1.700 \quad (3)$$

$$1.500 < Ndkn < 1.700 \quad (4)$$

where a refractive index based on the d line of the material of the resin lens Lkn included in the "k"th lens unit Lk and having negative refractive power is denoted by Ndkn, and the Abbe number thereof is denoted by vdkn In the "k"th lens unit Lk provided closer to the image plane than to the third lens unit L3, a positive lens Lkp that satisfies the conditional expressions (1) and (3) and a negative lens Lkn that satisfies the conditional expressions (2) and (4) are included.

Here, when refractive indexes of a material with respect to F line (486.1 nm), C line (656.3 nm), and d line (587.6 nm) are respectively represented as NF, NC, and Nd, the Abbe number vd is a value that can be expressed by vd=(Nd−1)/(NF−NC).

When the Abbe number vdkp based on the d line of the resin lens Lkp having positive refractive power becomes smaller than a lower limit of the conditional expression (1), it becomes difficult to sufficiently correct axial chromatic aberration or chromatic aberration of magnification occurring at the telephoto side of the resin lens Lkp, which is not desirable.

When the Abbe number vdkp based on the d line of the resin lens Lkp having positive refractive power becomes greater than an upper limit of the conditional expression (1), the resin material that falls within the range satisfying the value range of the conditional expression (3) is limited, which is not desirable.

When the Abbe number vdkn based on the d line of the resin lens Lkn having negative refractive power becomes smaller than a lower limit of the conditional expression (2), the resin material that falls within the range satisfying the value range of the conditional expression (4) is limited, which is not desirable.

When the Abbe number vdkn based on the d line of the resin lens Lkn having negative refractive power becomes greater than an upper limit of the conditional expression (2), it becomes difficult to sufficiently correct axial chromatic aberration and chromatic aberration of magnification occurring at the resin lens Lkn at the telephoto side, which is not desirable.

When the refractive index Ndkp based on the d line of the resin lens Lkp having positive refractive power becomes smaller than a lower limit of the conditional expression (3), curvature needs to be increased to maintain the refractive power of the resin lens Lkp. As a result, the sensitivity to plane shape changes caused by environmental changes becomes high and spherical aberration, coma aberration, or the like are likely to occur, which is not desirable.

When the refractive index Ndkp based on the d line of the resin lens Lkp having positive refractive power becomes greater than an upper limit of the conditional expression (3), the resin material that falls within the range satisfying the value range of the conditional expression (1) is limited, which is not desirable.

When the refractive index Ndkn based on the d line of the resin lens Lkn having negative refractive power becomes lower than a lower limit of the conditional expression (4), a need to enlarge the curvature arises to maintain the refractive power of the resin lens Lkn. As a result, sensitivity to plane shape changes caused by environmental changes becomes high and spherical aberration, coma aberration, or the like are likely to occur, which is not desirable.

When the refractive index Ndkn based on the d line of the resin lens Lkn having negative refractive power becomes greater than an upper limit of the conditional expression (4), the resin material that falls within the range satisfying the value range of the conditional expression (2) is limited, which is not desirable.

As described above, in each exemplary embodiment, each component is appropriately set to satisfy the conditional expressions (1) to (4). This configuration achieves a light-weight and high-zoom-ratio zoom lens that has high optical performance in the entire zoom area.

Here, in each exemplary embodiment, it is desirable to set the value ranges of the conditional expressions (1) to (4) as follows:

$$53.5 < vdkp < 59.0 \tag{1a}$$

$$20.0 < vdkn < 29.0 \tag{2a}$$

$$1.500 < Ndkp < 1.590 \tag{3a}$$

$$1.590 < Ndkn < 1.690 \tag{4a}$$

Further, it is more desirable to set the value ranges of the conditional expressions (1) to (4) as follows:

$$54.0 < vdkp < 58.5 \tag{1b}$$

$$21.0 < vdkn < 28.5 \tag{2b}$$

$$1.501 < Ndkp < 1.560 \tag{3b}$$

$$1.600 < Ndkn < 1.650 \tag{4b}$$

Further, in each exemplary embodiment, it is more desirable to satisfy one or more of the following conditional expressions:

$$\theta gFkp - (-1.667 \times 10^{-7} \times vdkp^3 + 5.280 \times 10^{-5} \times vdkp^2 - 5.620 \times 10^{-3} \times vdkp + 0.737) > 0 \tag{5}$$

$$\theta gFkn - (-1.667 \times 10^{-7} \times vdkn^3 + 5.280 \times 10^{-5} \times vdkn^2 - 5.620 \times 10^{-3} \times vdkn + 0.737) > 0 \tag{6}$$

$$8.0 < f1/fw < 50.0 \tag{7}$$

$$-0.160 < f2/ft < -0.010 \tag{8}$$

$$0.10 < |fp/fn| < 10.0 \tag{9}$$

$$50.0 < vd4n < 70.0 \tag{10}$$

$$1.500 < Nd4n < 1.700 \tag{11}$$

$$-3.00 < f4/f5 < -0.10 \tag{12}$$

In the conditional expressions, a relative partial dispersion of a material of the resin lens Lkp having positive refractive power is denoted by $\theta gFkp$, a relative partial dispersion of a material of the resin lens Lkn having negative refractive power is denoted by $\theta gFkn$, a focal length of the first lens unit L1 is denoted by f1, and the focal length of the second lens unit L2 is denoted by f2. Further, the focal length of the fourth lens unit L4 is denoted by f4, the focal length of the fifth lens unit L5 is denoted by f5, the focal length of the entire system at the wide-angle end is denoted by fw, and the focal length of the entire system at the telephoto end is denoted by ft. Further, the Abbe number of the material of the negative lens included in the fourth lens unit L4 is denoted by vd4n, and the refractive index thereof is denoted by Nd4n. Further, the focal length of the resin lens Lkp having positive refractive power is denoted by fp, and the focal length of the resin lens Lkn having negative refractive power is denoted by fn.

FIG. 11 is a diagram (a $\theta gF$-vd chart) illustrating optical characteristics of the lens materials. The vertical axis represents the relative partial dispersion $\theta gF$ and the horizontal axis represents the Abbe numbers vd. In the $\theta gF$-vd chart, many materials are distributed along a straight line called a normal line. In the exemplary embodiments, the normal line is expressed as follows:

$$\theta gF=-0.001682\times vd+0.6438$$

The Abbe number vd and the relative partial dispersion θgF are the values expressed as:

$$vd=(Nd-1)/(NF-NC)$$

$$\theta gF=(Ng-NF)/(NF-NC)$$

where a material's refractive indexes for the g line (wavelength 435.8 nm), the F line (486.1 nm), the C line (656.3 nm), and the d line (587.6 nm) are respectively denoted by Ng, NF, NC, and Nd.

In general, in each lens unit, it is important to properly select materials for the positive lens and the negative lens to suitably correct axial chromatic aberration and chromatic aberration of magnification.

The conditional expression (5) defines the relative partial dispersion θgFkp of the resin lens Lkp having positive refractive power. By forming the resin lens Lkp using a material satisfying the conditional expression (5), axial chromatic aberration at the telephoto end can be suitably corrected.

The conditional expression (6) defines the relative partial dispersion θgFkn of the resin lens Lkn having negative refractive power. By forming the resin lens Lkn using a material satisfying the conditional expression (6), chromatic aberration of magnification at the telephoto end can be suitably corrected.

The conditional expression (7) defines a ratio between the focal length f1 of the first lens unit L1 and the focal length fw of the entire system at the wide-angle end.

When the focal length f1 of the first lens unit L1 becomes shorter so that f1/fw falls below a lower limit of the conditional expression (7), the refractive power of the first lens unit L1 becomes too strong. As a result, chromatic aberration occurring at the telephoto side of the first lens unit L1 increases, which is not desirable.

When the focal length f1 of the first lens unit L1 becomes longer so that f1/fw exceeds an upper limit of the conditional expression (7), the refractive power of the first lens unit L1 becomes too weak. As a result, the amount of movement of the first lens unit L1 during zooming needs to be increased to realize a high magnification, and this increases the total lens length, which is not desirable.

The conditional expression (8) defines a ratio between the focal length f2 of the second lens unit L2 and the focal length ft of the entire system at the telephoto end.

When the focal length f2 of the second lens unit L2 becomes longer so that f2/ft falls below a lower limit of the conditional expression (8), the refractive power of the second lens unit L2 becomes too weak. As a result, it becomes difficult to realize the high magnification and to sufficiently correct distortion aberration at the wide angle side, which is not desirable.

When the focal length f2 of the second lens unit L2 becomes shorter so that f2/ft exceeds an upper limit of the conditional expression (8), the refractive power of the second lens unit L2 becomes too strong. As a result, it becomes difficult to sufficiently correct chromatic aberration of magnification at the wide angle side and image plane curvature in the entire zoom area, which is not desirable.

The conditional expression (9) defines a ratio between the focal length fp of the resin lens Lkp having positive refractive power and the focal length fn of the resin lens Lkn having negative refractive power.

When the focal length fp of the resin lens Lkp having positive refractive power becomes shorter than a lower limit of the conditional expression (9), the refractive power of the resin lens Lkp having positive refractive power becomes too strong. This is not preferable since a lot of chromatic aberration of magnification at the telephoto end is generated.

When the focal length fp of the resin lens Lkp having positive refractive power becomes longer than an upper limit of the conditional expression (9), the refractive power of the resin lens Lkp having positive refractive power becomes too weak. As a result, a lot of axial chromatic aberration at the telephoto end occurs, which is not desirable.

The conditional expression (10) defines the Abbe number vd4n of the material of the negative lens included in the fourth lens unit L4.

When the Abbe number vd4n of the material of the negative lens included in the fourth lens unit L4 becomes smaller than a lower limit of the conditional expression (10), a lot of color misregistration occurs, so that it becomes difficult to suitably correct axial chromatic aberration and chromatic aberration of magnification at the telephoto end. This is not desirable.

When the Abbe number vd4n of the material of the negative lens included in the fourth lens unit L4 becomes greater than an upper limit of the conditional expression (10), the material that falls within the range satisfying the value range of the conditional expression (11) is limited, which is not desirable.

The conditional expression (11) defines the refractive index Nd4n of the material of the resin lens having negative refractive power included in the fourth lens unit L4.

When the refractive index Nd4n of the material of the negative lens included in the fourth lens unit L4 becomes lower than a lower limit of the conditional expression (11), the curvature of the negative lens included in the fourth lens unit L4 becomes small to maintain the negative refractive power. As a result, a lot of spherical aberration and coma aberration occur due to deformation of the lens surface occur, which is not desirable.

When the refractive index Nd4n of the material of the negative lens included in the fourth lens unit L4 becomes greater than an upper limit of the conditional expression (11), the material that falls within a range satisfying the value range of the conditional expression (10) is limited.

The conditional expression (12) is a conditional expression that defines a ratio between the focal length f4 of the fourth lens unit L4 and the focal length f5 of the fifth lens unit L5.

When the focal length f4 of the fourth lens unit L4 becomes longer so that f4/f5 falls below a lower limit of the conditional expression (12), the magnification allocation of the fourth lens unit L4 becomes small, so that it becomes difficult to realize the high magnification, which is not desirable.

When the focal length f4 of the fourth lens unit L4 becomes shorter so that f4/f5 exceeds an upper limit of the conditional expression (12), the refractive power of the fourth lens unit L4 becomes too strong. As a result, a lot of chromatic aberration occurs at the fourth lens unit L4, which is not desirable.

It is desirable to set the value ranges of the conditional expressions (7) to (12) as follows:

$$9.0<f1/fw<40.0 \quad (7a)$$

$$-0.100<f2/ft<-0.020 \quad (8a)$$

$$0.15<|fp/fn|<7.0 \quad (9a)$$

$$50.5<vd4n<65.0 \quad (10a)$$

$$1.501<Nd4n<1.640 \quad (11a)$$

$$-2.00<f4/f5<-0.20 \quad (12a)$$

Here, further desirably, the value ranges of the conditional expressions (7) to (12) can be set as follows:

$$10.0<f1/fw<20.0 \quad (7b)$$

$$-0.060<f2/ft<-0.030 \quad (8b)$$

$$0.20<|fp/fn|<5.0 \quad (9b)$$

$$50.8<vd4n<60.0 \quad (10b)$$

$$1.501<Nd4n<1.590 \quad (11b)$$

$$-1.80<f4/f5<-0.25 \quad (12b)$$

Next, a configuration of each lens unit will be described.

In the zoom lens according to each exemplary embodiment, the first lens unit L1 consists of, in order from the object side to the image side, a negative lens, a positive lens, and a positive lens. By forming the first lens unit L1 to include one or more positive lenses and one or more negative lenses, chromatic aberration at the telephoto end can be suitably corrected.

In the zoom lens according to each exemplary embodiment, the second lens unit L2 is composed of, in order from the object plane to the image plane, a negative lens, a negative lens, and a positive lens. By forming the second lens unit L2 to include at least two negative lenses and a positive lens, image plane curvature and chromatic aberration of magnification at the wide-angle end can be suitably corrected.

In each exemplary embodiment, the third lens unit L3 consists of, in order from the object side to the image side thereof, a positive lens, a negative lens, and a positive lens.

In the zoom lens according to the first to third and fifth exemplary embodiments, the fourth lens unit L4 consists of a negative lens. In the zoom lens according to the fourth exemplary embodiment, the fourth lens unit L4 consists of, in order from the object side to the image side thereof, a negative lens and a positive lens. By forming the fourth lens unit L4 to include a single positive lens and a single negative lens, chromatic aberration occurring at the fourth lens unit L4 can be suitably corrected without increasing the number of lenses.

In the zoom lens according to the first and second exemplary embodiments, the rear lens group or fifth lens unit L5 consists of, in order from the object side to the image side thereof, a positive lens and a negative lens. In the zoom lens according to the third exemplary embodiment, as shown in FIG. 5, the fifth lens unit L5 or rear lens group consists of, in order from the object side to the image side thereof, a positive lens, a negative lens, and a positive lens. In the zoom lens according to the fourth exemplary embodiment, as shown in FIG. 7, the fifth lens unit L5 consists of a single positive lens.

In the zoom lens according to the fifth exemplary embodiment, as shown in FIG. 9, the rear lens group includes the fifth lens unit L5 and a sixth lens unit L6. The fifth lens unit L5 consists of a single positive lens, and the sixth lens unit L6 consists of, in order from the object side to the image side thereof, a positive lens and a negative lens.

In the zoom lens according to the first to third and fifth exemplary embodiments, the lens unit that is provided closest to the image plane IP includes a resin lens Lkp having positive refractive power and a resin lens Lkn having negative refractive power. In the zoom lens according to the fourth exemplary embodiment, the fourth lens unit L4 includes a resin lens Lkp having positive refractive power and a resin lens Lkn having negative refractive power.

Next, numerical embodiments 1 to 5 respectively corresponding to the first to fifth exemplary embodiments according to the present invention will be described. In each numerical embodiment, the order of the optical surface from the object side is denoted by "i". a curvature radius of the "i"th optical surface (the "i"th plane) is denoted by "ri", an interval between the "i"th plane and the "i+1"th plane is denoted by "di", a refractive index and the Abbe number of a material of the "i"th optical member with respect to the d line are denoted "ndi" and "vdi", respectively.

Further, the aspheric shape can be expressed as:

$$x=(h^2/R)/[1+[1-(1+K)(h/R)^2]^{1/2},]+A4h^4+A6h^6+A8h^8$$

where eccentricity is denoted by "K", aspheric coefficients are denoted by "A4," "A6," and "A8", and displacement in the optical axis direction at a position of height h from the optical axis is denoted by "x" based on the surface vertex. Here, the reference "R" represents a paraxial curvature radius. Further, the expression "e-Z" indicates "$10^{-Z}$."

In each exemplary embodiment, back focus (BF) represents a distance from an optical surface closest to the image plane IP in the lens system to the image plane IP based on an air equivalent length. Further, correspondence with the above described conditional expressions in each numerical embodiment will be illustrated in Table 1.

Here, an effective image circle diameter (a diameter of an image circle) at the wide-angle end can be made smaller than an effective image circle diameter at the telephoto end. This is because that barrel-shaped distortion aberration which is likely to occur at the wide-angle side can be corrected by expanding the image by image processing.

Numerical Embodiment 1

| Unit mm | | | | |
|---|---|---|---|---|
| Surface data | | | | |
| Surface number | r | d | nd | vd |
| 1 | 100.543 | 1.20 | 1.83400 | 37.2 |
| 2 | 43.687 | 4.80 | 1.49700 | 81.5 |
| 3 | −155.022 | 0.05 | | |
| 4 | 36.166 | 3.20 | 1.48749 | 70.2 |
| 5 | 111.778 | (variability) | | |
| 6 | 115.313 | 0.60 | 1.83481 | 42.7 |
| 7 | 7.831 | 4.60 | | |
| 8 | −20.973 | 0.50 | 1.80400 | 46.6 |
| 9 | 49.086 | 0.05 | | |
| 10 | 19.082 | 1.93 | 1.94595 | 18.0 |
| 11 | 323.647 | (variability) | | |
| 12 (stop) | ∞ | (variability) | | |
| 13* | 8.214 | 2.75 | 1.49710 | 81.6 |
| 14* | −34.396 | 2.57 | | |
| 15 | 27.277 | 0.40 | 1.80610 | 33.3 |
| 16 | 9.043 | 0.80 | | |
| 17* | 18.412 | 2.80 | 1.49710 | 81.6 |
| 18* | −29.358 | 0.00 | | |
| 19 | ∞ | (variability) | | |
| 20 | −27.105 | 0.40 | 1.53530 | 55.8 |
| 21 | 352.039 | (variability) | | |
| 22* | 21.231 | 2.90 | 1.53530 | 55.8 |

-continued

Unit mm

| | | | | |
|---|---|---|---|---|
| 23 | −20.867 | 0.30 | | |
| 24 | −19.563 | 0.50 | 1.63540 | 23.9 |
| 25 | −42.474 | (variability) | | |
| 26 | ∞ | 1.00 | 1.51633 | 64.1 |
| 27 | ∞ | 1.00 | | |
| Image plane | ∞ | | | |

Aspheric surface data

Thirteenth surface

K = −2.78153e−001 A4 = 7.75604e−005 A6 = −2.31923e−006
A8 = −1.80735e−007
Fourteenth surface K = 0.00000e+000 A4 = 4.24106e−004 A6 = −1.52221e−005
Seventeenth surface K = 0.00000e+000 A4 = 3.31324e−004 A6 = −2.90683e−005
Eighteenth surface K = 0.00000e+000 A4 = 2.30418e−004 A6 = −1.18668e−005
Twenty-second surface K = 0.00000e+000 A4 = 6.14253e−006 A6 = 1.16505e−007

Various data
Zoom ratio 43.24

| | | | |
|---|---|---|---|
| Focal length | 4.37 | 12.09 | 188.94 |
| F-number | 2.67 | 3.38 | 6.08 |
| Half angle of view | 37.01 | 17.77 | 1.17 |
| Image height | 3.29 | 3.88 | 3.88 |
| Total lens length | 86.75 | 85.52 | 126.08 |
| BF | 6.22 | 13.29 | 4.01 |
| d 5 | 0.65 | 14.15 | 58.40 |
| d11 | 33.52 | 5.82 | 0.62 |
| d12 | 7.96 | 11.26 | 0.77 |
| d19 | 3.41 | 3.48 | 6.82 |
| d21 | 4.66 | 7.17 | 25.11 |
| d25 | 4.56 | 11.63 | 2.35 |

Zoom lens unit data

| Unit | First surface | Focal length |
|---|---|---|
| 1 | 1 | 76.84 |
| 2 | 6 | −9.14 |
| 3 | 13 | 16.52 |
| 4 | 20 | −47.00 |
| 5 | 22 | 30.18 |

Numerical Embodiment 2

Unit mm
Surface data

| Surface number | r | d | nd | vd |
|---|---|---|---|---|
| 1 | 50.074 | 0.90 | 1.91082 | 35.3 |
| 2 | 26.329 | 4.00 | 1.49700 | 81.6 |
| 3 | −66737.393 | 0.05 | | |
| 4 | 26.869 | 3.25 | 1.59282 | 68.6 |
| 5 | 182.166 | (variability) | | |
| 6 | 104.351 | 0.40 | 1.83481 | 42.7 |
| 7 | 6.031 | 3.62 | | |
| 8 | −17.501 | 0.35 | 1.83481 | 42.7 |
| 9 | 30.358 | 0.05 | | |
| 10 | 14.338 | 1.60 | 1.95906 | 17.5 |
| 11 | 149.764 | (variability) | | |
| 12* | 7.165 | 1.94 | 1.49710 | 81.6 |
| 13* | 230.856 | 1.65 | | |

-continued

Unit mm

| | | | | |
|---|---|---|---|---|
| 14 (stop) | ∞ | 0.65 | | |
| 15 | 7.772 | 0.40 | 2.00069 | 25.5 |
| 16 | 5.903 | 0.60 | | |
| 17* | 11.002 | 1.83 | 1.49710 | 81.6 |
| 18* | −33.857 | 0.00 | | |
| 19 | ∞ | (variability) | | |
| 20* | −14.637 | 0.50 | 1.55624 | 51.0 |
| 21 | 20.021 | (variability) | | |
| 22* | 16.622 | 4.20 | 1.50200 | 58.0 |
| 23 | −9.758 | 0.20 | | |
| 24 | −8.871 | 0.50 | 1.61000 | 28.0 |
| 25 | −13.189 | (variability) | | |
| 26 | ∞ | 1.00 | 1.51633 | 64.1 |
| 27 | ∞ | 1.00 | | |
| Image plane | ∞ | | | |

Aspheric surface data

Twelfth surface

K = −7.16273e−001 A4 = −1.53471e−004 A6 = 1.74966e−005
A8 = 4.69757e−007
Thirteenth surface K = −1.52417e+004 A4 = −2.33725e−004 A6 = 3.56175e−005
Seventeenth surface K = −1.24423e+001 A4 = 8.67991e−004 A6 = 3.17416e−005
Eighteenth surface K = −7.76547e+001 A4 = −2.02924e−004 A6 = 4.85483e−005
Twentieth surface K = −5.23051e−001 A4 = −7.19566e−005 A6 = 6.91265e−006
Twenty-second surface K = 4.33555e+000 A4 = −1.12432e−004 A6 = −2.24135e−006

Various data
Zoom ratio 37.30

| | | | |
|---|---|---|---|
| Focal length | 4.49 | 14.00 | 167.49 |
| F-number | 3.25 | 4.43 | 7.10 |
| Half angle of view | 36.26 | 15.47 | 1.33 |
| Image height | 3.29 | 3.88 | 3.88 |
| Total lens length | 67.24 | 72.05 | 92.94 |
| BF | 8.21 | 17.07 | 4.22 |
| d 5 | 0.29 | 11.39 | 33.62 |
| d11 | 26.82 | 10.39 | 0.56 |
| d19 | 2.62 | 3.07 | 6.74 |
| d21 | 2.61 | 3.43 | 21.11 |
| d25 | 6.55 | 15.41 | 2.56 |

Zoom lens unit data

| Unit | First surface | Focal length |
|---|---|---|
| 1 | 1 | 46.97 |
| 2 | 6 | −6.64 |
| 3 | 12 | 12.11 |
| 4 | 20 | −15.12 |
| 5 | 22 | 17.60 |

Numerical Embodiment 3

Unit mm
Surface data

| Surface number | r | d | nd | vd |
|---|---|---|---|---|
| 1 | 101.105 | 1.20 | 1.83400 | 37.2 |
| 2 | 43.926 | 4.80 | 1.49700 | 81.5 |

-continued

Unit mm

| Surface number | r | d | nd | vd |
|---|---|---|---|---|
| 3 | −155.810 | 0.05 | | |
| 4 | 36.264 | 3.20 | 1.48749 | 70.2 |
| 5 | 110.572 | (variability) | | |
| 6 | 210.583 | 0.60 | 1.83481 | 42.7 |
| 7 | 7.859 | 4.40 | | |
| 8 | −20.576 | 0.50 | 1.80400 | 46.6 |
| 9 | 56.048 | 0.05 | | |
| 10 | 19.337 | 1.93 | 1.94595 | 18.0 |
| 11 | 351.895 | (variability) | | |
| 12 (stop) | ∞ | (variability) | | |
| 13* | 8.865 | 2.75 | 1.49710 | 81.6 |
| 14* | −39.282 | 2.57 | | |
| 15 | 25.521 | 0.40 | 1.80610 | 33.3 |
| 16 | 9.249 | 0.80 | | |
| 17* | 16.149 | 2.80 | 1.49710 | 81.6 |
| 18* | −20.284 | 0.00 | | |
| 19 | ∞ | (variability) | | |
| 20 | −31.957 | 0.40 | 1.50200 | 58.0 |
| 21 | 22.373 | (variability) | | |
| 22 | 18.688 | 2.20 | 1.53160 | 55.8 |
| 23 | −42.690 | 0.30 | | |
| 24 | −30.447 | 0.50 | 1.60737 | 27.0 |
| 25 | 3846.825 | 0.20 | | |
| 26 | 98.915 | 1.20 | 1.48749 | 70.2 |
| 27 | −32.207 | (variability) | | |
| 28 | ∞ | 1.00 | 1.51633 | 64.1 |
| 29 | ∞ | 1.00 | | |
| Image plane | ∞ | | | |

Aspheric surface data

Thirteenth surface

K = −2.78153e−001 A4 = 3.58043e−006 A6 = −5.74597e−007
A8 = −9.47184e−008
Fourteenth surface K = 0.00000e+000 A4 = 2.18540e−004 A6 = −6.62032e−006
Seventeenth surface K = 0.00000e+000 A4 = 3.24109e−005 A6 = −1.82397e−005
Eighteenth surface K = 0.00000e+000 A4 = 2.68288e−005 A6 = −1.08004e−005

Various data
Zoom ratio 42.81

| Focal length | 4.41 | 11.82 | 188.70 |
|---|---|---|---|
| F-number | 2.88 | 3.64 | 6.08 |
| Half angle of view | 36.77 | 18.16 | 1.18 |
| Image height | 3.29 | 3.88 | 3.88 |
| Total lens length | 86.41 | 84.89 | 124.98 |
| BF | 7.70 | 13.67 | 3.44 |
| d 5 | 0.65 | 14.21 | 58.67 |
| d11 | 29.76 | 5.71 | 0.69 |
| d12 | 10.62 | 11.22 | 0.71 |
| d19 | 3.00 | 4.51 | 10.26 |
| d21 | 3.83 | 4.72 | 20.37 |
| d27 | 6.04 | 12.02 | 1.78 |

Zoom lens unit data

| Unit | First surface | Focal length |
|---|---|---|
| 1 | 1 | 77.44 |
| 2 | 6 | −9.01 |
| 3 | 13 | 15.55 |
| 4 | 20 | −26.15 |
| 5 | 22 | 25.12 |

Numerical Embodiment 4

Unit mm

Surface data

| Surface number | r | d | nd | vd |
|---|---|---|---|---|
| 1 | 100.857 | 1.20 | 1.83400 | 37.2 |
| 2 | 43.839 | 4.70 | 1.49700 | 81.5 |
| 3 | −153.423 | 0.05 | | |
| 4 | 36.322 | 3.05 | 1.48749 | 70.2 |
| 5 | 111.139 | (variability) | | |
| 6 | 422.344 | 0.60 | 1.83481 | 42.7 |
| 7 | 7.799 | 4.40 | | |
| 8 | −20.250 | 0.50 | 1.80400 | 46.6 |
| 9 | 49.961 | 0.05 | | |
| 10 | 19.470 | 1.93 | 1.94595 | 18.0 |
| 11 | 568.694 | (variability) | | |
| 12 (stop) | ∞ | (variability) | | |
| 13* | 8.521 | 2.75 | 1.49710 | 81.6 |
| 14* | −40.517 | 2.57 | | |
| 15 | 25.688 | 0.40 | 1.83481 | 42.7 |
| 16 | 9.017 | 0.60 | | |
| 17* | 15.243 | 2.80 | 1.49710 | 81.6 |
| 18* | −23.049 | 0.50 | | |
| 19 | ∞ | (variability) | | |
| 20 | −24.911 | 0.40 | 1.60737 | 27.0 |
| 21 | 26.950 | 0.20 | | |
| 22 | 31.107 | 0.80 | 1.53160 | 55.8 |
| 23 | 114.671 | (variability) | | |
| 24* | 17.895 | 2.90 | 1.53160 | 55.8 |
| 25 | −43.600 | (variability) | | |
| 26 | ∞ | 1.00 | 1.51633 | 64.1 |
| 27 | ∞ | 1.00 | | |
| Image plane | ∞ | | | |

Aspheric surface data

Thirteenth surface

K = −2.78153e−001 A4 = 1.65829e−005 A6 = −2.48705e−006
A8 = −1.05222e−007
Fourteenth surface K = 0.00000e+000 A4 = 2.74395e−004 A6 = −1.01879e−005
Seventeenth surface K = 0.00000e+000 A4 = 1.44799e−004 A6 = −1.52215e−005
Eighteenth surface K = 0.00000e+000 A4 = 8.40564e−005 A6 = −5.58969e−006
Twenty-fourth surface K = 0.00000e+000 A4 = −1.78822e−005 A6 = 1.53993e−007

Various data
Zoom ratio 42.98

| Focal length | 4.38 | 10.93 | 188.09 |
|---|---|---|---|
| F-number | 3.58 | 4.13 | 6.28 |
| Half angle of view | 35.98 | 19.51 | 1.18 |
| Image height | 3.18 | 3.88 | 3.88 |
| Total lens length | 86.66 | 85.39 | 125.88 |
| BF | 6.33 | 13.70 | 6.68 |
| d 5 | 0.65 | 14.54 | 59.59 |
| d11 | 29.76 | 6.71 | 1.05 |
| d12 | 10.89 | 11.26 | 0.35 |
| d19 | 4.00 | 4.50 | 10.42 |
| d23 | 4.64 | 4.29 | 17.40 |
| d25 | 4.67 | 12.04 | 5.02 |

Zoom lens unit data

| Unit | First surface | Focal length |
|---|---|---|
| 1 | 1 | 77.16 |
| 2 | 6 | −8.60 |
| 3 | 13 | 15.90 |

-continued

Unit mm

| | | |
|---|---|---|
| 4 | 20 | −29.00 |
| 5 | 24 | 24.26 |

Numerical Embodiment 5

Unit mm

Surface data

| Surface number | r | d | nd | vd |
|---|---|---|---|---|
| 1 | 99.904 | 1.20 | 1.83400 | 37.2 |
| 2 | 43.685 | 5.20 | 1.49700 | 81.5 |
| 3 | −148.399 | 0.05 | | |
| 4 | 36.292 | 3.40 | 1.48749 | 70.2 |
| 5 | 112.594 | (variability) | | |
| 6 | 305.621 | 0.60 | 1.83481 | 42.7 |
| 7 | 7.797 | 4.40 | | |
| 8 | −19.977 | 0.50 | 1.80400 | 46.6 |
| 9 | 49.748 | 0.05 | | |
| 10 | 19.389 | 1.93 | 1.94595 | 18.0 |
| 11 | 329.425 | (variability) | | |
| 12 (stop) | ∞ | (variability) | | |
| 13* | 8.821 | 2.75 | 1.49710 | 81.6 |
| 14* | −34.109 | 2.57 | | |
| 15 | 25.932 | 0.40 | 1.80610 | 33.3 |
| 16 | 9.215 | 0.60 | | |
| 17* | 15.419 | 2.80 | 1.49710 | 81.6 |
| 18* | −20.481 | 0.00 | | |
| 19 | ∞ | (variability) | | |
| 20 | −18.008 | 0.40 | 1.53480 | 55.7 |
| 21 | 22.324 | (variability) | | |
| 22 | 24.570 | 1.00 | 1.90366 | 31.3 |
| 23 | 44.064 | (variability) | | |
| 24* | 20.783 | 2.90 | 1.53160 | 55.8 |
| 25 | −13.545 | 0.30 | | |
| 26 | −13.276 | 0.50 | 1.63540 | 23.9 |
| 27 | −31.868 | (variability) | | |
| 28 | ∞ | 1.00 | 1.51633 | 64.1 |
| 29 | ∞ | 1.00 | | |
| Image plane | ∞ | | | |

Aspheric surface data

Thirteenth surface

K = −2.78153e−001 A4 = −5.03877e−006 A6 = −2.10411e−006
A8 = −9.22740e−008
Fourteenth surface K = 0.00000e+000 A4 = 2.60464e−004 A6 = −8.61164e−006
Seventeenth surface K = 0.00000e+000 A4 = 2.15241e−004 A6 = −9.46935e−006
Eighteenth surface K = 0.00000e+000 A4 = 1.50934e−004 A6 = −2.17869e−006
Twenty-fourth surface K = 0.00000e+000 A4 = −6.15845e−006 A6 = 6.46551e−008

Various data
Zoom ratio 45.11

| | | | |
|---|---|---|---|
| Focal length | 4.43 | 11.15 | 200.00 |
| F-number | 2.98 | 3.60 | 6.08 |
| Half angle of view | 36.61 | 19.17 | 1.11 |
| Image height | 3.29 | 3.88 | 3.88 |
| Total lens length | 86.83 | 85.85 | 126.85 |
| BF | 4.72 | 13.02 | 3.82 |
| d 5 | 0.65 | 13.86 | 57.78 |
| d11 | 29.76 | 7.33 | 1.05 |
| d12 | 10.31 | 10.38 | 0.35 |

-continued

Unit mm

| | | | |
|---|---|---|---|
| d19 | 4.10 | 3.98 | 9.10 |
| d21 | 0.91 | 0.99 | 3.94 |
| d23 | 4.83 | 4.74 | 19.26 |
| d27 | 3.06 | 11.37 | 2.16 |

Zoom lens unit data

| Unit | First surface | Focal length |
|---|---|---|
| 1 | 1 | 75.76 |
| 2 | 6 | −8.47 |
| 3 | 13 | 14.99 |
| 4 | 20 | −18.57 |
| 5 | 22 | 60.00 |
| 6 | 24 | 27.19 |

TABLE 1

| | Exemplary Embodiments | | | | |
|---|---|---|---|---|---|
| | 1 | 2 | 3 | 4 | 5 |
| Conditional Expression (1) | 55.76 | 58.00 | 55.84 | 55.84 | 55.84 |
| Conditional Expression (2) | 23.89 | 28.00 | 27.03 | 27.03 | 23.89 |
| Conditional Expression (3) | 1.535 | 1.502 | 1.532 | 1.532 | 1.532 |
| Conditional Expression (4) | 1.635 | 1.610 | 1.607 | 1.607 | 1.635 |
| Conditional Expression (5) | 0.562 | 0.570 | 0.568 | 0.568 | 0.568 |
| Conditional Expression (6) | 0.635 | 0.640 | 0.634 | 0.634 | 0.635 |
| Conditional Expression (7) | 17.58 | 10.46 | 17.57 | 17.63 | 17.09 |
| Conditional Expression (8) | −0.048 | −0.040 | −0.048 | −0.046 | −0.042 |
| Conditional Expression (9) | 0.35 | 0.28 | 0.50 | 3.77 | 0.44 |
| Conditional Expression (10) | 55.8 | 51.0 | 58.0 | — | 55.7 |
| Conditional Expression (11) | 1.535 | 1.556 | 1.502 | — | 1.535 |
| Conditional Expression (12) | −1.56 | −0.86 | −1.04 | −1.20 | −0.31 |

Next, an exemplary embodiment of a digital still camera in which the zoom lens described in each exemplary embodiment is used as a photographic optical system will be described with reference to FIG. 12.

In FIG. 12, the digital still camera includes a camera body 20, and a photographic optical system 21 including any zoom lenses described in the first to fifth exemplary embodiments. A solid-state image pickup element 22 (photoelectric conversion element) such as the CCD sensor, the CMOS sensor or the like, which is built in the camera body, receives an object image formed by the photographic optical system 21. A memory 23 records information corresponding to the object image which is photoelectrically converted by the solid-state image pickup element 22. A finder 24 composed of a liquid crystal display panel or the like is used for observing an object image formed on the image pickup element 22.

As described above, when the zoom lens according to an exemplary embodiment of the present invention is applied to an imaging apparatus such as a digital still camera, a compact and high-zoom-ratio imaging apparatus that has high optical performance in the entire zoom area can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242515, filed Nov. 28, 2014, which is hereby incorporated by reference herein in its entirety.

What is claimed is:

1. A zoom lens comprising, in order from an object side to an image side:
a first lens unit having positive refractive power;
a second lens unit having negative refractive power;
a third lens unit having positive refractive power;
a fourth lens unit having negative refractive power; and
a rear lens group including one or more lens units and having positive refractive power,
wherein a distance between the lens units arranged next to each other changes during zooming,
wherein one lens unit among the fourth lens unit and the one or more lens units included in the rear lens group comprises a resin lens Lkp having positive refractive power and a resin lens Lkn having negative refractive power, and
wherein following conditional expressions are satisfied:

$50.0 < vdkp < 70.0$, $15.0 < vdkn < 30.0$, $1.500 < Ndkp < 1.700$, and $1.500 < Ndkn < 1.700$ where a refractive index of a material of the resin lens Lkp having positive refractive power is denoted by Ndkp, Abbe number thereof is denoted by vdkp, a refractive index of a material of the resin lens Lkn having negative refractive power is denoted by Ndkn, and Abbe number thereof is denoted by vdkn.

2. The zoom lens according to claim 1, wherein following conditional expressions are satisfied:

$\theta gFkp - (-1.667 \times 10^{-7} \times vdkp^3 + 5.280 \times 10^{-5} \times vdkp^2 - 5.620 \times 10^{-3} \times vdkp + 0.737) > 0$ and $\theta gFkn - (-1.667 \times 10^{-7} \times vdkn^3 + 5.280 \times 10^{-5} \times vdkn^2 - 5.620 \times 10^{-3} \times vdkn + 0.737) > 0$ where a relative partial dispersion of the material of the resin lens Lkp having positive refractive power is denoted by $\theta gFkp$, and a relative partial dispersion of the material of the resin lens Lkn having negative refractive power is denoted by $\theta gFkn$.

3. The zoom lens according to claim 1, wherein a following conditional expression is satisfied:

$8.0 < f1/fw < 50.0$ where a focal length of the first lens unit is denoted by f1, and a focal length of the entire system at a wide-angle end is denoted by fw.

4. The zoom lens according to claim 1, wherein a following conditional expression is satisfied:

$-0.160 < f2/ft < -0.010$ where a focal length of the second lens unit is denoted by f2, and a focal length of the entire system at a telephoto end is denoted by ft.

5. The zoom lens according to claim 1, wherein a following conditional expression is satisfied:

$0.10 < fp/fnl < 10.0$ where a focal length of the resin lens Lkp having positive refractive power is denoted by fp, and a focal length of the resin lens Lkn having negative refractive power is denoted by fn.

6. The zoom lens according to claim 1, wherein, during zooming, the first lens unit has moved to a position closer to an object side when the zoom lens is at a telephoto end than when the zoom lens is at a wide-angle end.

7. The zoom lens according to claim 1, wherein the first lens unit consists of, in order from the object side to the image side, a negative lens, a positive lens, and a positive lens.

8. The zoom lens according to claim 1,
wherein the resin lens Lkp having positive refractive power and the resin lens Lkn having negative refractive power are included in a lens unit provided closer to the image side than to the fourth lens unit; and
wherein the fourth lens unit has a resin lens having negative refractive power that satisfies the following conditional expressions:

$50.0 < vd4n < 70.0$ and $1.500 < Nd4n < 1.700$ where Abbe number of a material of the negative lens included in the fourth lens unit is denoted by vd4n and a refractive index thereof is denoted by Nd4n.

9. The zoom lens according to claim 1, wherein the rear group comprises a fifth lens unit having positive refractive power.

10. The zoom lens according to claim 9, wherein a following conditional expression is satisfied:

$-3.00 < f4/f5 < -0.10$ where a focal length of the fourth lens unit is denoted by f4 and a focal length of the fifth lens unit is denoted by f5.

11. The zoom lens according to claim 1, wherein the first lens unit, the second lens unit, the third lens unit, the fourth lens unit and the rear lens group are arranged to form an image on an image pickup element.

12. An imaging apparatus comprising:
a zoom lens including
a first lens unit having positive refractive power;
a second lens unit having negative refractive power;
a third lens unit having positive refractive power;
a fourth lens unit having negative refractive power; and
a rear group including one or more lens units and having positive refractive power,
wherein a distance between the lens units arranged next to each other changes during zooming,
wherein one lens unit among the fourth lens unit and the one or more lens units included in the rear lens group comprises a resin lens Lkp having positive refractive power and a resin lens Lkn having negative refractive power, and
wherein following conditional expressions are satisfied:

$50.0 < vdkp < 70.0$, $15.0 < vdkn < 30.0$, $1.500 < Ndkp < 1.700$, and $1.500 < Ndkn < 1.700$ where a refractive index of a material of the resin lens Lkp having positive refractive power is denoted by Ndkp, Abbe number thereof is denoted by vdkp, a refractive index of a material of the resin lens Lkn having negative refractive power is denoted by Ndkn, and Abbe number thereof is denoted by vdkn; and an image pickup element configured to receive an image formed by the zoom lens.

13. The zoom lens according to claim 1, wherein, during zooming, the resin lens Lkp having positive refractive power and the resin lens Lkn having negative refractive power move integrally along a common locus.

14. The zoom lens according to claim 1, wherein the resin lens Lkp having positive refractive power and the resin lens Lkn having negative refractive power are arranged in this order from the object side to the image side.

* * * * *